United States Patent
Menon et al.

(10) Patent No.: US 11,924,437 B2
(45) Date of Patent: Mar. 5, 2024

(54) VARIABLE FRAMERATE ENCODING USING CONTENT-AWARE FRAMERATE PREDICTION FOR HIGH FRAMERATE VIDEOS

(71) Applicant: Bitmovin GmbH, Klagenfurt am Wörthersee (AT)

(72) Inventors: Vignesh V. Menon, Klagenfurt am Wörthersee (AT); Hadi Amirpour, Klagenfurt am Wörthersee (AT); Christian Timmerer, Klagenfurt am Wörthersee (AT)

(73) Assignee: Bitmovin GmbH, Klagenfurt am Wörthersee (AT)

( * ) Notice: Subject to any disclaimer, the term of this patent is extended or adjusted under 35 U.S.C. 154(b) by 0 days.

(21) Appl. No.: 17/706,095

(22) Filed: Mar. 28, 2022

(65) Prior Publication Data

US 2023/0308657 A1   Sep. 28, 2023

(51) Int. Cl.
*H04N 19/00*   (2014.01)
*H04N 19/149*   (2014.01)
*H04N 19/172*   (2014.01)
*H04N 19/179*   (2014.01)
*H04N 19/30*   (2014.01)

(52) U.S. Cl.
CPC ......... *H04N 19/149* (2014.11); *H04N 19/172* (2014.11); *H04N 19/179* (2014.11); *H04N 19/30* (2014.11)

(58) Field of Classification Search
CPC .. H04N 19/149; H04N 19/172; H04N 19/179; H04N 19/30
See application file for complete search history.

(56) References Cited

U.S. PATENT DOCUMENTS

| | | | |
|---|---|---|---|
| 2005/0047504 A1* | 3/2005 | Sung | H04N 19/136 375/E7.211 |
| 2006/0039470 A1* | 2/2006 | Kim | H04N 19/57 348/E5.066 |
| 2009/0003445 A1* | 1/2009 | Ying | H04N 19/172 375/E7.199 |

(Continued)

OTHER PUBLICATIONS

Mercat UVG Dataset: 50/120fps 4K Sequences for Video Codec Analysis and Development In Proceedings of ACM Multimedia Systems Conference (MMSys'20). ACM, Istanbul, Turkey, 6 pages. https://doi.org/10.1145/3339825.3394937. Jun. 2020.*

(Continued)

*Primary Examiner* — Frank F Huang
(74) *Attorney, Agent, or Firm* — Marton Ribera Schumann & Chang LLP; Chien-Ju Alice Chuang; Hector J. Ribera

(57) ABSTRACT

The technology described herein relates to variable framerate encoding. A method for variable framerate encoding includes receiving shots, as segmented from a video input, extracting features for each of the shots, the features including at least a spatial energy feature and an average temporal energy, predicting a frame dropping factor for each of the shots based on the spatial energy feature and the average temporal energy, predicting an optimized framerate for each of the shots based on the frame dropping factor, downscaling and encoding each of the shots using the optimized framerate. The encoded shots may then be decoded and upscaled back to their original framerates.

16 Claims, 5 Drawing Sheets

(56) References Cited

U.S. PATENT DOCUMENTS

| | | | | |
|---|---|---|---|---|
| 2009/0010556 | A1* | 1/2009 | Uchibayashi | H04N 19/105 |
| | | | | 375/E7.176 |
| 2009/0190655 | A1* | 7/2009 | Shimada | H04N 19/164 |
| | | | | 375/E7.076 |
| 2010/0040148 | A1* | 2/2010 | Marpe | H04N 19/61 |
| | | | | 375/E7.123 |
| 2011/0129116 | A1* | 6/2011 | Thorwirth | H04N 19/467 |
| | | | | 382/100 |
| 2013/0027230 | A1* | 1/2013 | Marpe | H04N 19/91 |
| | | | | 341/107 |

OTHER PUBLICATIONS

Herrou et al., Quality-Driven Variable Frame-Rate for Green Video Coding in Broadcast Applications, IEEE Transactions on Circuits and Systems for Video Technology, vol. 31, No. 11, Nov. 2021.*

Bentaleb et al., "A Survey on Bitrate Adaptation Schemes for Streaming Media Over HTTP,", IEEE Communications Surveys & Tutorials, vol. 21, No. 1, 2019, pp. 562-585.

Madhusudana et al., "Subjective and Objective Quality Assessment of High Frame Rate Videos", IEEE Access, vol. 9, Sep. 27, 2021,. pp. 1-15.

Herrou et al., "Quality-driven Variable Frame-Rate for Green Video Coding in Broadcast Application", IEEE Transactions on Circuits and Systems for Video Technology, Dec. 29, 2020, pp. 1-15.

Huynh-Thu et al., "Impact of Jitter and Jerkness on Perceived Video Quality", Conference: 2nd International Workshop on Video Processing for Consumer Electronics, Jan. 2006, pp. 1-6.

International Telecommunication Union, Subjective Video Quality Assessment Methods for Multimedia Applications, Nov. 2021, pp. 1-50.

V.V Menon et al., "Efficient Content-Adaptive Feature-Based Shot Detection for HTTP Adaptive Streaming" IEEE, May 20, 2021, pp. 1-2, https://www.youtube.com/watch?v=jkA1R0shpTc.

International Telecommunication Union (ITU), "H.265: High Efficiency Video Coding", Aug. 2021, pp. 1, https://www.itu.int/rec/T-REC-H.265-202108-P/en.

Multicoreware Inc., "x265 HEVC Encoder / H.265 Video Codec", 2021, pp. 1-3, http://x265.org/.

Multicoreware Inc., "x265 Command Line Options", 2014, pp. 1-29, https://x265.readthedocs.io/en/master/cli.html.

Boyce et al., "JVET-J1010: JVET common test conditions and software reference configurations", Research Gate, Jul. 2018, pp. 1-6, https://www.researchgate.net/publication/326506581_JVET J1010_JVET_common_test_conditions_and_software_reference_configurations.

FFMPEG, "FFMPEG Documentation", 2021, pp. 1-50, https://ffmpeg.org/ffmpeg.html.

Li et al., "VMAF: The Journey Continues", Netfilx Technology Blog, Oct. 25, 2018, pp. 1-13.

* cited by examiner

VARIABLE FRAMERATE ENCODING USING CONTENT-AWARE FRAMERATE PREDICTION FOR HIGH FRAMERATE VIDEOS

BACKGROUND OF INVENTION

High framerate (HFR) video streaming is becoming more common for ultra high definition televisions (UHDTV). UHDTV provide a better immersive audiovisual experience due to better resolution, High Dynamic Range (HDR), Wide Colour Gamut (WCG), Next Generation Audio (NGA), and HFR, allowing for framerates of up to 120 frames per second (fps). Such increases in framerate, however, significantly increases encoding and decoding complexities, which results in corresponding increases in encoding and decoding times and bit-rate overhead.

The high bit-rate requirement for HFR videos typically calls for a trade-off between perceived video quality of a compressed video at its original framerate and the video compressed at a lower framerate and upscaled in the temporal domain at, for example, the client. Conventional techniques may drop frames to improve quality for remaining frames. However, this leads to introduction of temporal artifacts when the video is upscaled to the original framerate. Some conventional variable framerate (VFR) coding schemes have been employed to reduce distortion, but they also have limitations, such as being limited to three framerates, complexity due to the use of two random forest classifiers, and lack of consideration of bitrate of the encoded video. See G. Herrou et al., "Quality-driven Variable Frame-Rate for Green Video Coding in Broadcast Applications," IEEE Transactions on Circuits and Systems for Video Technology, p. 1, 2020; Alexandre Mercat, Marko Viitanen, and Jarno Vanne, "UVG Dataset: 50/120 fps 4K Sequences for Video Codec Analysis and Development," p. 297-302, Association for Computing Machinery, New York, NY, USA, 2020.

Thus, it is desirable to have variable framerate encoding using content-aware framerate prediction for high framerate videos when frame dropping.

BRIEF SUMMARY

The present disclosure provides for techniques relating to variable framerate encoding using content-aware framerate prediction for high framerate videos. A method for variable framerate encoding may include: receiving a plurality of shots; extracting two or more features for each of the plurality of shots, the two or more features including at least a spatial energy feature and an average temporal energy; predicting a frame dropping factor for each of the plurality of shots based on the spatial energy feature and the average temporal energy; predicting an optimized framerate for each of the plurality of shots based on the frame dropping factor; and encoding each of the plurality of shots using the optimized framerate. In some examples, the method may also include segmenting an input video into the plurality of shots. In some examples, the method may also include downscaling the plurality of shots using the frame dropping factor. In some examples, predicting the frame dropping factor comprises modeling an exponential decay function. In some examples, the frame dropping factor is with a minimum to maximum range. In some examples, the minimum to maximum range is from 0 to ⅚. In some examples, predicting the frame dropping factor comprises determining a video resolution and original framerate dependent proportion constant. In some examples, the video resolution and original framerate dependent proportion constant is a Menon Amirpour framerate coefficient $\beta_{MA}$. In some examples, the extracting the two or more features comprises calculating an average texture energy and an average gradient of the texture energy using a DCT-based energy function.

In some examples, the method also may include predicting an optimal resolution for each of the plurality of shots at each of a set of resolutions using a convex-hull prediction algorithm. In some examples, the optimal resolution is predicted based on the two or more features. In some examples, predicting the optimal resolution comprises a bitrate-resolution pair. In some examples, the bitrate-resolution pair is determined based on a number of video frames per second. In some examples, the average temporal energy is determined as a function of a sum of absolute differences of a texture energy of each frame compared to its previous frame.

In some examples, the method also may include decoding the plurality of shots. In some examples, the method also may include upscaling the plurality of shots to an original framerate. In some examples, the method also may include displaying the plurality of shots at the original framerate.

A system for variable framerate encoding may include: a memory comprising non-transitory computer-readable storage medium configured to store at least a set of bitrates and a set of resolutions; one or more processors configured to execute instructions stored on the non-transitory computer-readable storage medium to: receive a plurality of shots, extract two or more features for each of the plurality of shots, the two or more features including at least a spatial energy feature and an average temporal energy, predict a frame dropping factor for each of the plurality of shots based on the spatial energy feature and the average temporal energy, predict an optimized framerate for each of the plurality of shots based on the frame dropping factor, and encode each of the plurality of shots using the optimized framerate. In some examples, the memory is further configured to store, and the one or more processors are further configured to implement, a neural network configured to perform the prediction of the optimized framerate.

DETAILED DESCRIPTION

Figure 1A:
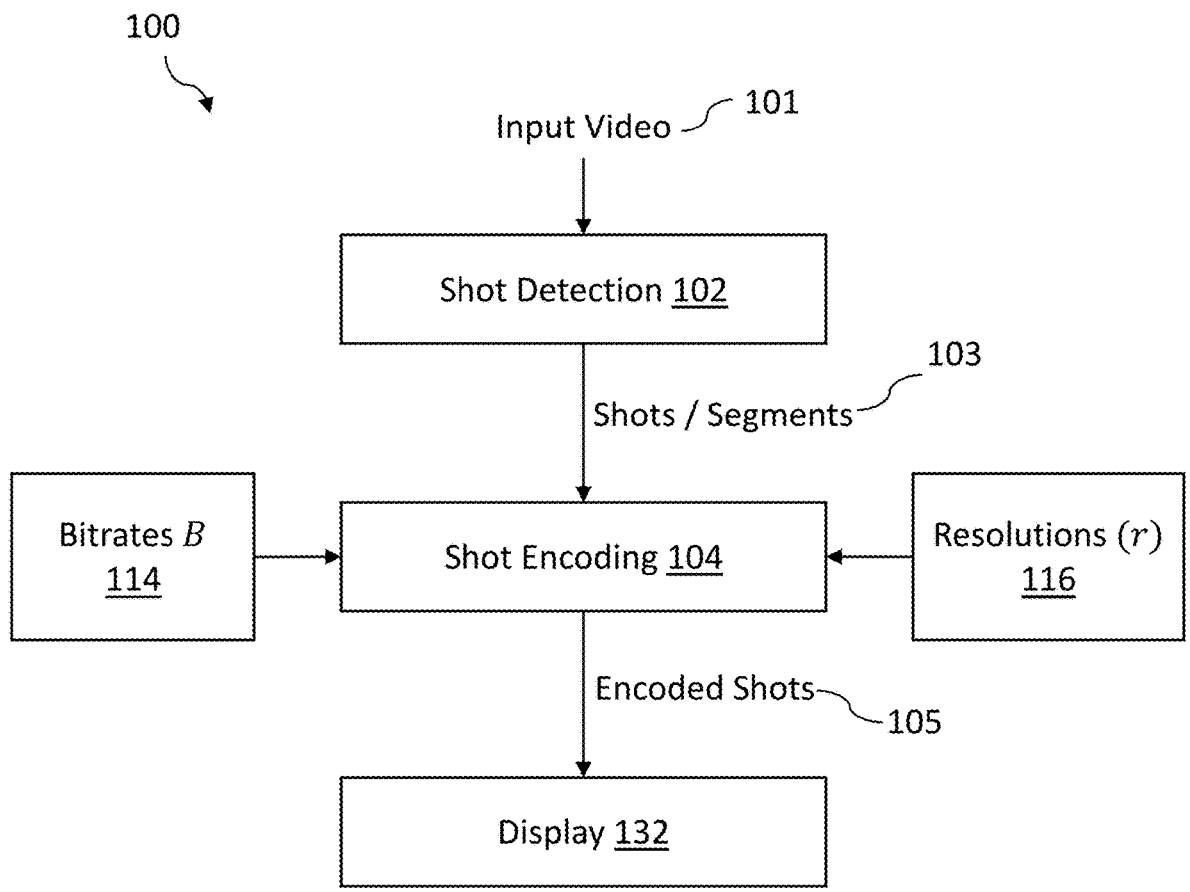
FIG. 1A is a simplified block diagram of an exemplary variable framerate encoding framework for adaptive streaming, in accordance with one or more embodiments.

The Figures and the following description describe certain embodiments by way of illustration only. One of ordinary skill in the art will readily recognize from the following description that alternative embodiments of the structures and methods illustrated herein may be employed without departing from the principles described herein. Reference will now be made in detail to several embodiments, examples of which are illustrated in the accompanying figures.

The above and other needs are met by the disclosed methods, a non-transitory computer-readable storage medium storing executable code, and systems for live per-title encoding.

In this invention, a low-latency pre-processing algorithm (i.e., a content-aware framerate prediction algorithm or CODA) may be used to predict the optimized framerate for encoding a given video (e.g., a video segment or shot) at every bitrate and resolution, particularly for HFR videos and in the context of HTTP Adaptive Streaming (HAS). CODA uses said content-aware features, including Discrete Cosine Transform (DCT) energy-based low-complexity spatial and temporal features extracted for a video, to determine video characteristics. Based on said features, the optimized framerate for each video may be predicted. The encoding process may then be carried out with the predicted framerate, saving encoding time and improving visual quality at lower bitrates.

In some examples, also based on said extracted features, a low-complexity convex-hull prediction algorithm may be implemented prior to optimized framerate prediction to predict an optimal resolution for each video segment at every target bitrate from a pre-defined set of resolutions for encoding for bitrate savings, while maintaining the same or similar quality as typical per-title encoding (e.g., as measured by Peak Signal-to-Noise Ratio (PSNR) and/or Video Multimethod Assessment Fusion (VMAF)).

CODA may include the steps of extracting features and predicting optimized framerate. Feature extraction may include calculating an average texture energy and an average gradient of the average texture energy. Optimized frame-rate prediction may include determining a frame dropping factor for each shot of a video using a video resolution dependent proportion constant (e.g., Menon Amirpour coefficient, $\beta_{MA}$), which may be determined for each resolution.

FIG. 1 is a simplified block diagram of an exemplary multi-shot encoding framework for adaptive streaming, in accordance with one or more embodiments. Framework 100 includes shot detection module 102, shot encoding module 104, and display 132. Shot detection module 102 may be configured to receive input video 101 and segment the video into a plurality of shots 103, for example, by dividing input video 101 into segments, making and storing copies of segments of video input 101, extracting segments from input video 101, or other methods. In some examples, input video 101 may include video content for a live or adaptive streaming application (e.g., HAS). In some examples, shots 103 may include a plurality of segments of some or all of input video 101. Each segment length may be seconds or tens of seconds, or other suitable length for input to shot encoding module 104. In some examples, shots 103 may all be similar in length, while in other examples, they may vary in length. Shots 103, along with characteristics of each shot, may be provided to shot encoding module 104 configured to encode each of shots 103 and to output encoded shots 105.

Figure 1B:
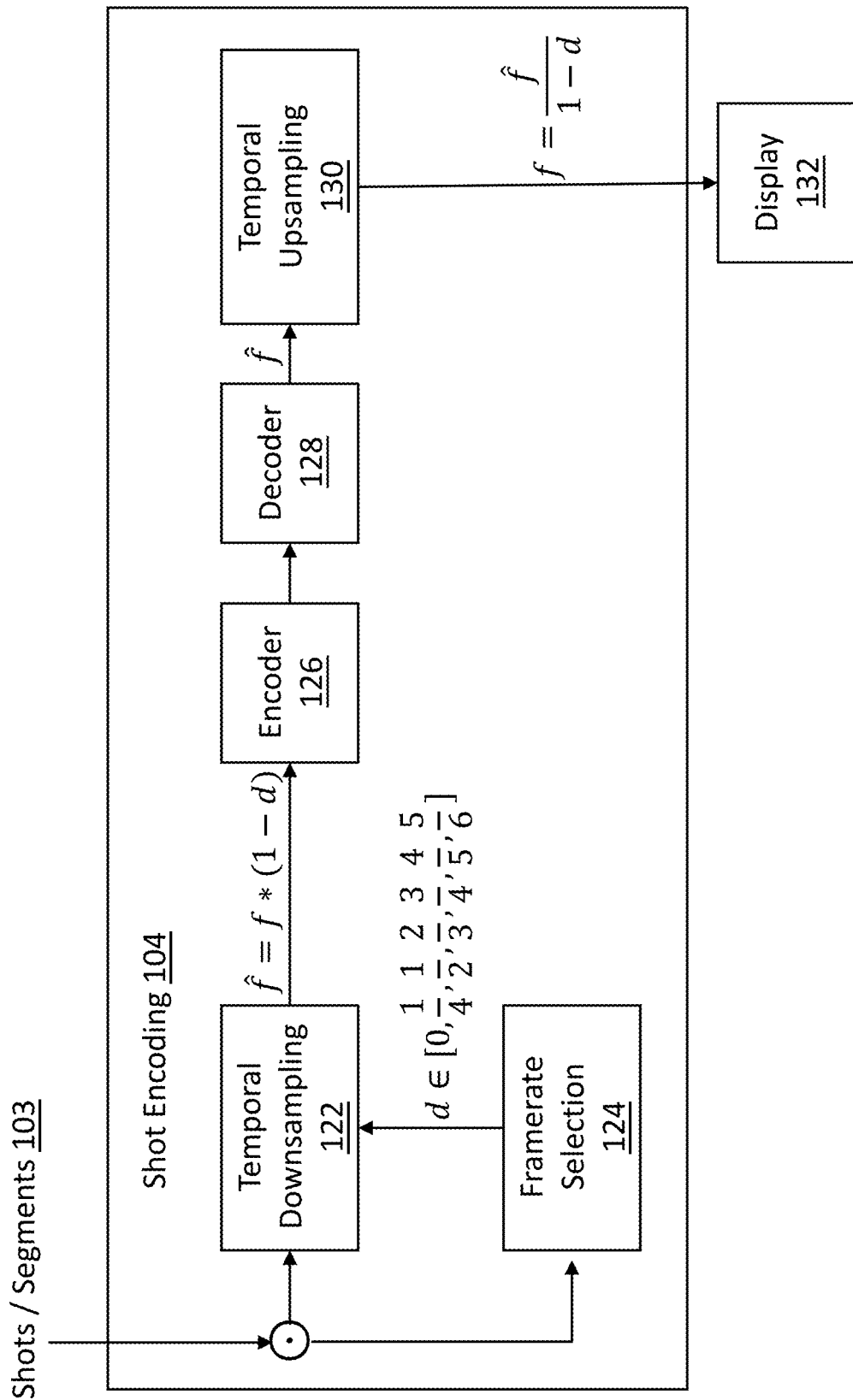
FIG. 1B is a simplified block diagram of an exemplary shot encoding module in a variable framerate encoding framework, in accordance with one or more embodiments.

As shown in more detail in FIG. 1B, shot encoding module 104 may be configured to implement a non-causal pre-processing algorithm (i.e., CODA) to predict an optimal framerate for each of shots 103 at every bitrate and resolution. Said pre-processing algorithm may downscale (i.e., downsample by temporal downsampling module 122) each of shots 103 to a set of spatial resolutions r (e.g., resolutions 116), and encode each of shots 103 at a set of bitrates B (e.g., bitrates 114). In some examples, temporal downsampling module 122 may comprise a neural network (e.g., convolutional neural network). Shot encoding module 104 also may be configured to select an optimal resolution for each bitrate for each shot.

For each of shots 103, shot encoding module 104 may calculate at least two features-a spatial energy feature and an average temporal energy-including calculating an average texture energy and an average gradient of the texture energy using a DCT-based energy function. This example DCT-based energy function may be used to determine a block-wise texture of a frame:

$$H_{p,k} = \sum_{i=0}^{w-1}\sum_{j=0}^{w-1} e^{\left|\left(\frac{ij}{w^2}\right)^2 - 1\right|} |DCT(i,j)|$$

Frame p has a block address k, and the block size is w×w pixels (e.g., 32×32 pixels, 64×64 pixels, or larger or smaller). In other examples, the block size may have a width w and a height l length λ, and the energy function may be a function of w×λ instead of $w^2$. DCT(i,j) is the $(i,j)^{th}$ DCT component when i+j>2, and otherwise it is 0. Exponentially higher costs are assigned to higher DCT frequencies (e.g., caused by a mixture of objects). The texture is averaged to determine the spatial energy feature denoted as E:

$$E = \sum_{p=1}^{P}\sum_{k=1}^{C} \frac{H_{p,k}}{P*C}$$

In this function, C represents the number of blocks per frame, and P denotes a number of frames in the shot. The blockwise SAD (i.e., sum of absolute differences) of the texture energy of each frame compared to its previous frame may be computed and averaged for each frame of the video to obtain an average temporal energy h:

$$h = \sum_{p=1}^{P-1}\sum_{k=0}^{C-1} \frac{SAD(H_{p,k}, H_{p-1,k})}{(P-1)*C}$$

Spatial feature value E and temporal feature value h may be used to predict a frame dropping factor d by framerate selection module 124 for optimized framerate prediction. To determine the frame dropping factor, an exponential decay function may be modeled for each of shots 103:

$$d = d_0 e^{-Kb}$$

where $d_0$ represents a ratio of the number of dropped frames to a total number of frames per second at b=0, K determines a rate of decay, and b is a target bitrate for encoding. Frame dropping factor d may vary between different shots 103 (i.e., different video content) and different bitrates b. An example set D of frame dropping factors d may include:

$$D: \left[0, \frac{1}{4}, \frac{1}{2}, \frac{2}{3}, \frac{3}{4}, \frac{4}{5}, \frac{5}{6}\right]$$

In other examples, set D may comprise a different set of frame dropping factors d within another range of maximum and minimum frame dropping factors. In this example, when d=0 no frames are dropped, and when $$d = \frac{5}{6}$$

five out of six frames are dropped uniformly across the shot.

The rate of decay (K) is proportional to temporal characteristics of a shot and a target bitrate for encoding, while being inversely proportional to spatial characteristics and the original framerate of the shot:

$$K = \frac{\beta_{MA}(r, f) * h}{E}$$

The proportion constant Menon Amirpour framerate coefficient is represented by $\beta_{MA}$, which depends on resolution r (e.g., from resolutions 116) and original framerate f. Therefore, the frame dropping factor also may be represented as:

$$d = d_0 e^{\frac{\beta_{MA}(r, f) * h * b}{E}}$$

In some examples, the set of bitrates 114 (e.g., 145 kbps, 450 kbps, 1.6 Mbps, the set sometimes including more or less bitrates) may be pre-defined and may include target bitrate b. $\beta_{MA}$ may be determined using the half-life of an exponential decay function, such as the bitrate when d becomes ½:

$$b_{\frac{1}{2}} = \frac{\ln(2)}{K}$$

Therefore, solving for the proportion constant Menon Amirpour framerate coefficient $\beta_{MA}$:

$$\beta_{MA} = \frac{\ln(2) * E * f}{h * b_{\frac{1}{2}}}$$

$\beta_{MA}$ values obtained for every resolution (r) (e.g., resolutions 116) and original framerate f are averaged to determine $\beta_{MA}(r,f)$. An optimized framerate $\hat{f}$ may be predicted for any shot 103 for every target bitrate in bitrates 113 using extracted spatial feature value E and temporal feature value h, as demonstrated in this example Algorithm 1:

| Algorithm 1: Optimized frame-rate prediction algorithm |
| --- |
| Inputs:<br>  r : video resolution<br>  f : original frame rate<br>  D : set of all frame drop factors $\bar{d}$<br>  B : set of all target bit-rates b (in kbps)<br>Output: $\hat{f}(b) \; \forall \; b \in B$<br>Step 1: Compute E, h features.<br>Step 2: Determine $\hat{d}(b)$.<br><br>$$\hat{d}(b) = d_0 e^{-\frac{\beta_{MA}(r, f) * h * b}{E}}$$<br><br>Step 3: Map $\hat{d}(b)$ to the closest $\bar{d}$ to get d(b).<br>The predicted optimized frame-rate for the video is given by:<br>  $\hat{f}(b) = f \cdot (1 - d(b))$ |

Returning to FIG. 1B, frames may be dropped based on predicted frame dropping factor d and encoded by encoder 126 with the predicted, optimized framerate f as determined by:

$$\hat{f} = f^*(1-d)$$

Shots 103 may then be decoded at decoder 128 and upscaled in the temporal domain at temporal upsampling module 130 to the original framerate f, for example using frame duplication or other upscaling methods, for display (e.g., by display 132). In some examples, decoder 128 may further be configured to improve the video and QoE using video interpolation techniques.

In some examples, spatial feature value E and temporal feature value h also may be used for convex hull prediction to predict an optimal resolution for every target bitrate for each shot, thereby generating bitrate-resolution pairs. An example convex-hull prediction algorithm may be represented as follows:

| Algorithm 2: Convex-hull prediction algorithm |
| --- |
| Inputs:<br>  f : number of video frames per second<br>  S : set of all resolution scaling factors $\bar{s}$<br>  B : set of all target bitrates b (in kbps)<br>Output: $s(b) \; \forall \; b \in B$<br>Step 1: Compute E, h features.<br>Step 2: Determine $\hat{s}(b)$.<br><br>$$\hat{s}(b) = 1 - s_0 e^{-\frac{\Gamma_{MA}(f) * h * b}{E}}$$<br><br>Step 3: Map $\hat{s}(b)$ to the closest $\bar{s}$ to get s(b). |

In Algorithm 2, Step 2 may generate a fraction between 0 and 1. This fraction may be mapped to a nearest value in the set s. In an example, if s={0.25, 0.5, 1}, a resulting fraction of 0.3 may be mapped to s(b)=0.25, as that is the closest value in the set s.

Convex-hull prediction (e.g., using a neural network or other machine learning model) may be configured to receive as input bitrate quality pairs. Convex-hull prediction may be configured to output bitrate-resolution pairs comprising a resolution scaling factor as a function of a target bitrate for some or all bitrates in the set of bitrates 114 (e.g., s(b) $\forall b \in B$).

Figure 2A:
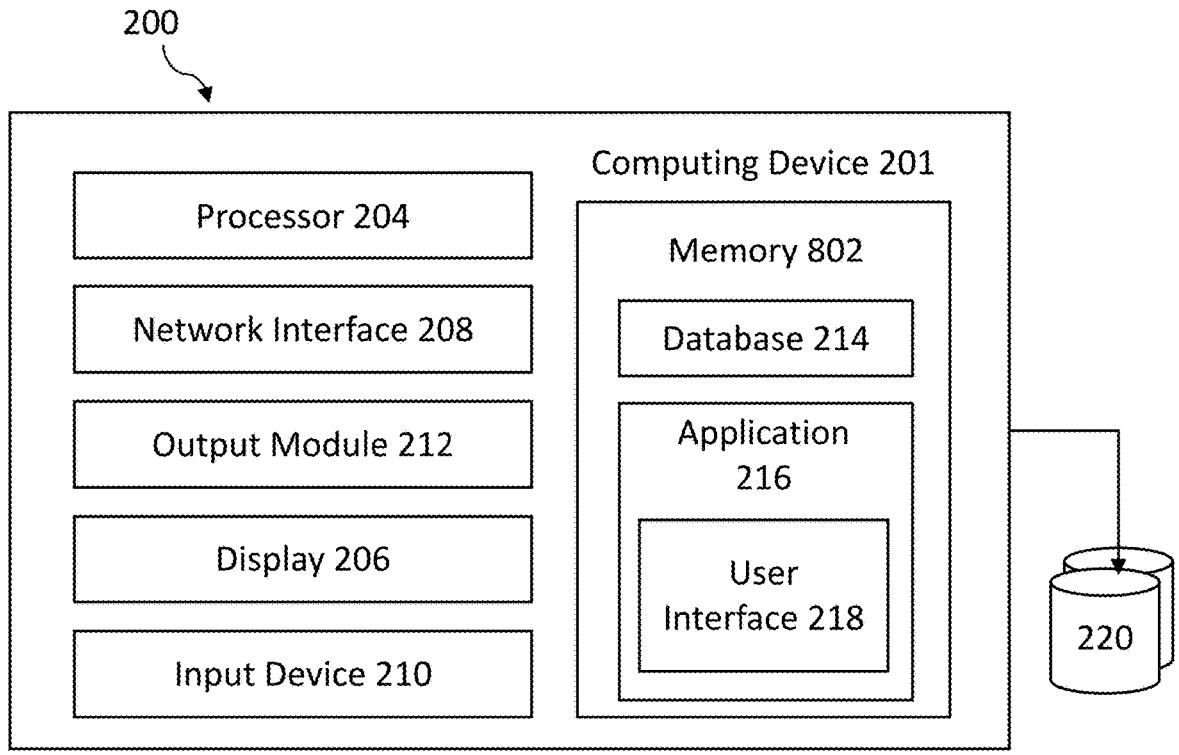
FIG. 2A is a simplified block diagram of an exemplary computing system configured to implement the framework illustrated in FIG. 1A and perform steps of the method illustrated in FIG. 3, in accordance with one or more embodiments.
Figure 2B:
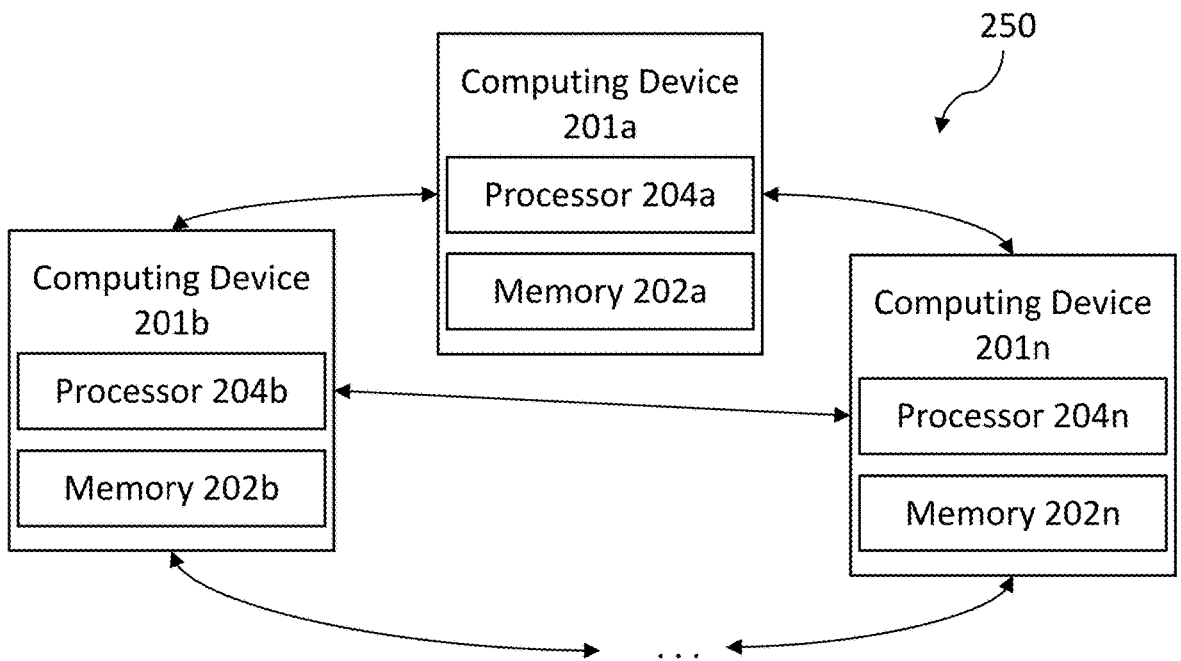
FIG. 2B is a simplified block diagram of an exemplary distributed computing system implemented by a plurality of the computing devices, in accordance with one or more embodiments.
Figure 3:
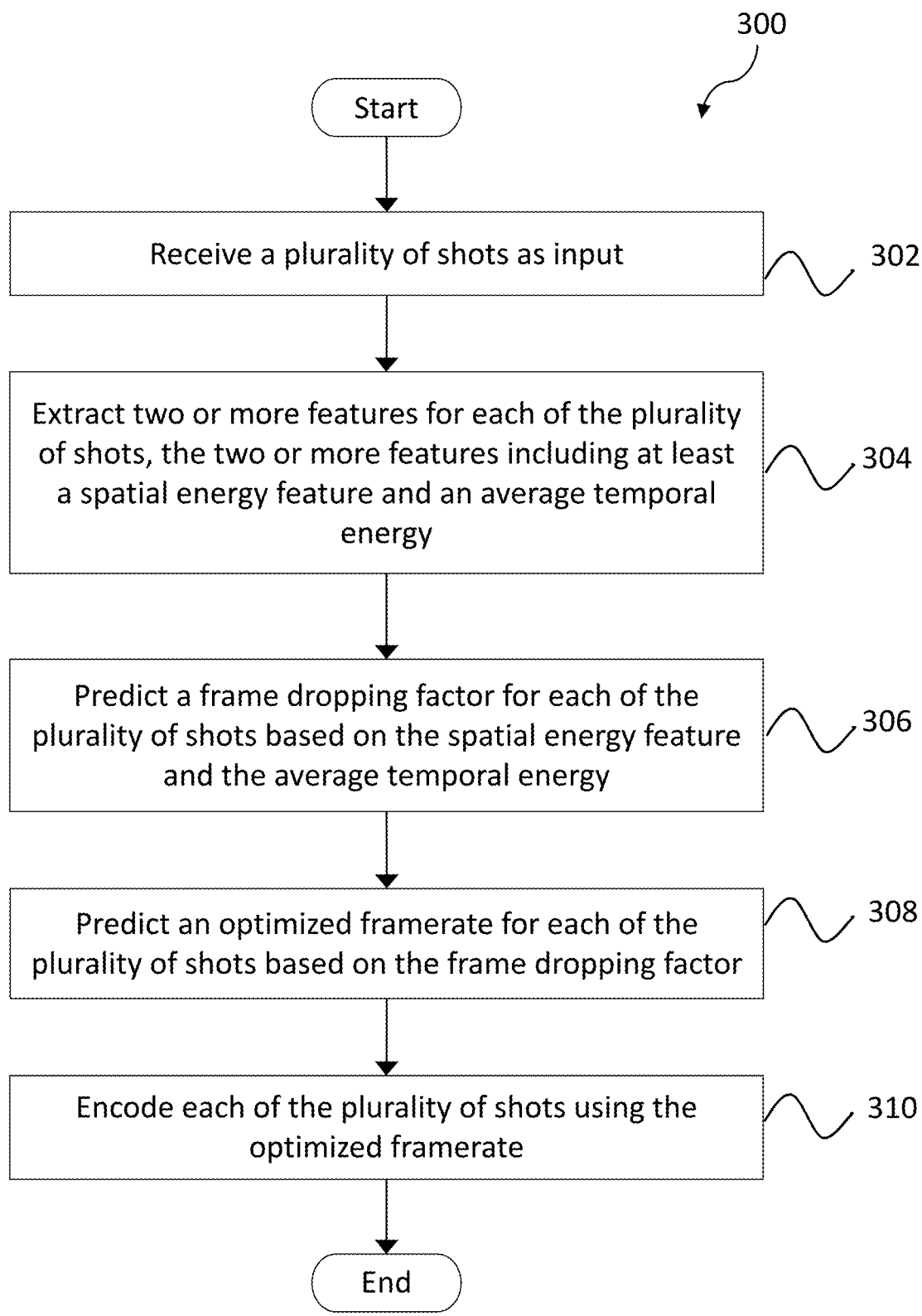
FIG. 3 is a flow diagram illustrating an exemplary method for variable framerate encoding using content-aware framerate prediction, in accordance with one or more embodiments.

FIG. 2A is a simplified block diagram of an exemplary computing system configured to implement the framework illustrated in FIG. 1A and perform steps of the method illustrated in FIG. 3, in accordance with one or more embodiments. In one embodiment, computing system 200 may include computing device 201 and storage system 220. Storage system 220 may comprise a plurality of repositories and/or other forms of data storage, and it also may be in communication with computing device 201. In another embodiment, storage system 220, which may comprise a plurality of repositories, may be housed in one or more of computing device 201. In some examples, storage system 220 may store networks, video data, bitrate ladders, metadata, instructions, programs, and other various types of information as described herein. This information may be retrieved or otherwise accessed by one or more computing devices, such as computing device 201, in order to perform some or all of the features described herein. Storage system 220 may comprise any type of computer storage, such as a hard drive, memory card, ROM, RAM, DVD, CD-ROM, write-capable, and read-only memories. In addition, storage system 220 may include a distributed storage system where data is stored on a plurality of different storage devices, which may be physically located at the same or different geographic locations (e.g., in a distributed computing system such as system 250 in FIG. 2B). Storage system 220 may be networked to computing device 201 directly using wired connections and/or wireless connections. Such network may include various configurations and protocols, including short range communication protocols such as Bluetooth™, Bluetooth™ LE, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

Computing device 201, which in some examples may be included in mobile device 201 and in other examples may be included in server 108, also may include a memory 202. Memory 202 may comprise a storage system configured to store a database 214 and an application 216. Application 216 (e.g., per) may include instructions which, when executed by a processor 204, cause computing device 201 to perform various steps and/or functions (e.g., implementing an optimized framerate prediction algorithm, implementing a convex-hull prediction algorithm), as described herein. Application 216 further includes instructions for generating a user interface 218 (e.g., graphical user interface (GUI)). Database 214 may store various algorithms and/or data, including neural networks (e.g., convolutional neural networks) and data regarding bitrates, videos, device characteristics, network performance, among other types of data. Memory 202 may include any non-transitory computer-readable storage medium for storing data and/or software that is executable by processor 204, and/or any other medium which may be used to store information that may be accessed by processor 204 to control the operation of computing device 201.

Computing device 201 may further include a display 206 (e.g., similar to display 132), a network interface 208, an input device 210, and/or an output module 212. Display 206 may be any display device by means of which computing device 201 may output and/or display data. Network interface 208 may be configured to connect to a network using any of the wired and wireless short range communication protocols described above, as well as a cellular data network, a satellite network, free space optical network and/or the Internet. Input device 210 may be a mouse, keyboard, touch screen, voice interface, and/or any or other hand-held controller or device or interface by means of which a user may interact with computing device 201. Output module 212 may be a bus, port, and/or other interfaces by means of which computing device 201 may connect to and/or output data to other devices and/or peripherals.

In one embodiment, computing device 201 is a data center or other control facility (e.g., configured to run a distributed computing system as described herein), and may communicate with a media playback device (e.g., mobile device 101). As described herein, system 200, and particularly computing device 201, may be used for video playback, running an application, upscaling video, providing feedback to a server, and otherwise implementing steps in a variable framerate encoding method, as described herein. Various configurations of system 200 are envisioned, and various steps and/or functions of the processes described below may be shared among the various devices of system 200 or may be assigned to specific devices.

FIG. 2B is a simplified block diagram of an exemplary distributed computing system implemented by a plurality of the computing devices, in accordance with one or more embodiments. System 250 may comprise two or more computing devices 201a-n. In some examples, each of 201a-n may comprise one or more of processors 204a-n, respectively, and one or more of memory 202a-n, respectively. Processors 204a-n may function similarly to processor 204 in FIG. 2A, as described above. Memory 202a-n may function similarly to memory 202 in FIG. 2A, as described above.

FIG. 3 is a flow diagram illustrating an exemplary method for variable framerate encoding using content-aware framerate prediction, in accordance with one or more embodiments. Method 300 may begin with receiving a plurality of shots, at step 302, for example, as input to a shot encoding module. In some examples, the plurality of shots may be generated by a shot detection module configured to segment an input video into the plurality of shots. Two or more features may be extracted for each of the plurality of shots, at step 304, the two or more features including at least a spatial energy feature and an average temporal energy. A frame dropping factor for each of the plurality of shots may be predicted at step 306. As described herein, the frame dropping factor may be predicted based on the spatial energy feature and the average temporal energy. An optimized framerate for each of the plurality of shots may be predicted at step 308 (e.g., by framerate selection module 124). As described herein, the optimized framerate may be predicted based on the frame dropping factor. In some examples, temporal downscaling (e.g., by temporal downsampling module 122) may be performed based on the optimized framerate. Each of the plurality of shots may be encoded at step 310 (e.g., by encoder 126) using the optimized framerate. In some examples, the plurality of shots may then be decoded (e.g., by decoder 128) and upscaled to the original framerate (e.g., by temporal upsampling module 130). In some examples, the decoded and upscaled video may be displayed by a client device (e.g., by display 132).

In some examples, the methods described herein may be used with an HEVC/H.265 encoder. In other examples, other coding standards may be used (e.g., VVC, AVC/H.264).

Figure 4A:
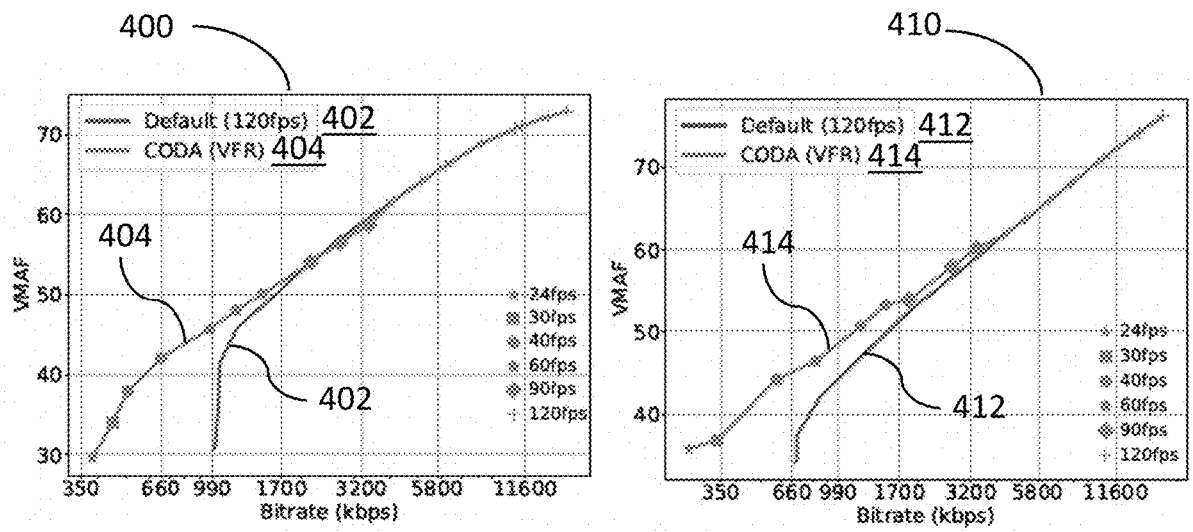
FIG. 4A includes charts illustrating rate distortion (RD) curves of encoding exemplary video inputs using a variable framerate encoding method as compared to a default framerate encoding method, in accordance with one or more embodiments.
Figure 4B:
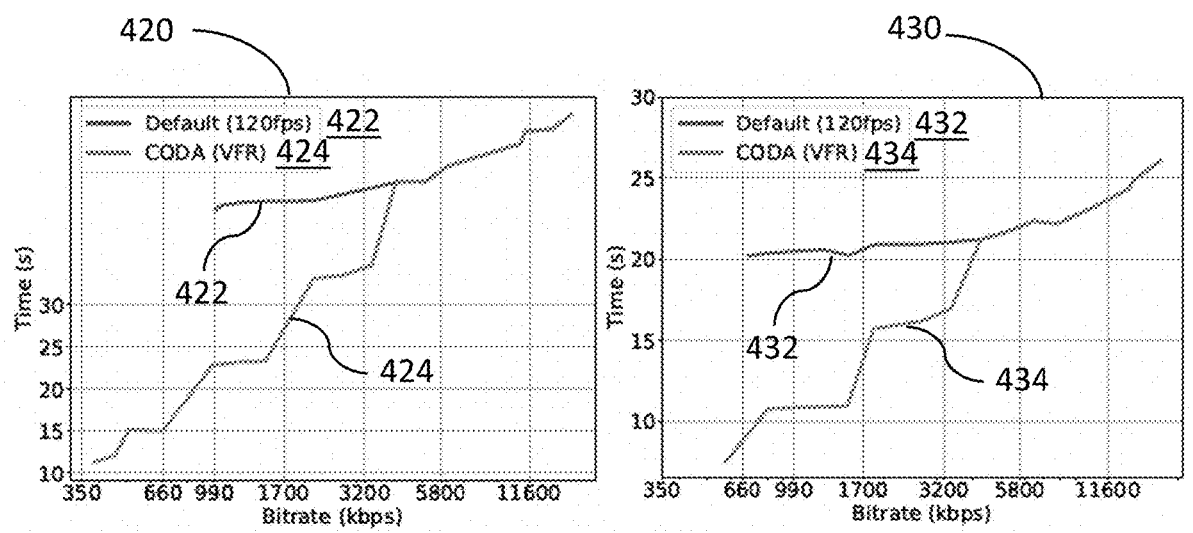
FIG. 4B includes charts illustrating encoding times for encoding exemplary video inputs using a variable framerate encoding method as compared to a default framerate encoding method, in accordance with one or more embodiments.

FIG. 4A includes charts illustrating rate distortion (RD) curves of encoding exemplary video inputs using a variable framerate encoding method as compared to a default framerate encoding method, in accordance with one or more embodiments. Charts 400 and 410 show video quality measurements using a perceptual video quality assessment method (e.g., VMAF, PSNR) at various bitrates. Lines 402 and 412 indicate VMAF data for encoding two respective exemplary videos using a conventional default framerate (e.g., 120 fps) for a high framerate (HFR) video. Lines 404 and 414 indicate VMAF data for encoding the same two respective exemplary videos using a variable framerate encoding method, as described herein, with optimized framerates (e.g., 24 fps, 30 fps, 40 fps, 60 fps, 90 fps, and 120 fps) being selected at each bitrate. As shown, a variable framerate encoding method, as described herein, results in higher quality video output, particularly at mid-lower bitrates, and the same quality video output at the higher bitrates. As shown in FIG. 4B, in addition to the same or higher quality video, there is significant encoding time savings using a variable framerate encoding method wherein an optimized framerate is determined and used for encoding.

FIG. 4B includes charts illustrating encoding times for encoding exemplary video inputs using a variable framerate encoding method as compared to a default framerate encoding method, in accordance with one or more embodiments. Charts 420 and 430 show encoding times for various bitrates. Lines 422 and 432 indicate encoding times for encoding two respective exemplary videos using a conventional default framerate (e.g., 120 fps) for a high framerate (HFR) video. Lines 424 and 434 indicate encoding times for encoding the same two respective exemplary videos using a variable framerate encoding method, as described herein, with optimized framerates being selected at each bitrate. As shown, there is significant encoding time savings using the variable framerate encoding method, at least until approximately 4000 kbps, when lines 422 and 432 meet lines 424 and 434, respectively.

While specific examples have been provided above, it is understood that the present invention can be applied with a wide variety of inputs, thresholds, ranges, and other factors, depending on the application. For example, the time frames and ranges provided above are illustrative, but one of ordinary skill in the art would understand that these time frames and ranges may be varied or even be dynamic and variable, depending on the implementation.

As those skilled in the art will understand, a number of variations may be made in the disclosed embodiments, all without departing from the scope of the invention, which is defined solely by the appended claims. It should be noted that although the features and elements are described in particular combinations, each feature or element can be used alone without other features and elements or in various combinations with or without other features and elements. The methods or flow charts provided may be implemented in a computer program, software, or firmware tangibly embodied in a computer-readable storage medium for execution by a general-purpose computer or processor.

Examples of computer-readable storage mediums include a read only memory (ROM), random-access memory (RAM), a register, cache memory, semiconductor memory devices, magnetic media such as internal hard disks and removable disks, magneto-optical media, and optical media such as CD-ROM disks.

Suitable processors include, by way of example, a general-purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, or any combination of thereof.

What is claimed is:

1. A method for variable framerate encoding, comprising:
    receiving a plurality of shots;
    extracting two or more features for each of the plurality of shots, the two or more features including at least a spatial energy feature and an average temporal energy;
    predicting a frame dropping factor for each of the plurality of shots based on the spatial energy feature and the average temporal energy, the frame dropping factor being within a minimum to maximum range;
    predicting an optimized framerate for each of the plurality of shots based on the frame dropping factor; and
    encoding each of the plurality of shots using the optimized framerate.

2. The method of claim 1, further comprising segmenting an input video into the plurality of shots.

3. The method of claim 1, further comprising downscaling the plurality of shots using the frame dropping factor.

4. The method of claim 1, wherein predicting the frame dropping factor comprises modeling an exponential decay function.

5. The method of claim 1, wherein the minimum to maximum range is from 0 to ⅚.

6. The method of claim 1, wherein predicting the frame dropping factor comprises determining a video resolution and original framerate dependent proportion constant.

7. The method of claim 6, wherein the video resolution and original framerate dependent proportion constant is a Menon Amirpour framerate coefficient $\beta_{BA}$.

8. The method of claim 1, wherein the extracting the two or more features comprises calculating an average texture energy and an average gradient of the texture energy using a DCT-based energy function.

9. The method of claim 1, further comprising predicting an optimal resolution for each of the plurality of shots at each of a set of resolutions using a convex-hull prediction algorithm.

10. The method of claim 8, wherein the optimal resolution is predicted based on the two or more features.

11. The method of claim 1, wherein the average temporal energy is determined as a function of a sum of absolute differences of a texture energy of each frame compared to its previous frame.

12. The method of claim 1, further comprising decoding the plurality of shots.

13. The method of claim 1, further comprising upscaling the plurality of shots to an original framerate.

14. The method of claim 13, further comprising displaying the plurality of shots at the original framerate.

15. A system for variable framerate encoding, comprising:
    a memory comprising non-transitory computer-readable storage medium configured to store at least a set of bitrates and a set of resolutions;
    one or more processors configured to execute instructions stored on the non-transitory computer-readable storage medium to:
    receive a plurality of shots,
    extract two or more features for each of the plurality of shots, the two or more features including at least a spatial energy feature and an average temporal energy,
    predict a frame dropping factor for each of the plurality of shots based on the spatial energy feature and the average temporal energy, the frame dropping factor being within a minimum to maximum range,
    predict an optimized framerate for each of the plurality of shots based on the frame dropping factor, and
    encode each of the plurality of shots using the optimized framerate.

16. The system of claim 15, wherein the memory is further configured to store, and the one or more processors are further configured to implement, a neural network configured to perform the prediction of the optimized framerate.

* * * * *